United States Patent
D'Agostino

[19]

[11] Patent Number: 6,010,626
[45] Date of Patent: Jan. 4, 2000

[54] COMPACT PORTABLE HAND-OPERATED FILTER FOR PURIFYING WATER

[75] Inventor: Adriano D'Agostino, Uster, Switzerland

[73] Assignee: Katadyn Produkte AG, Wallisellen, Switzerland

[21] Appl. No.: 09/011,386

[22] PCT Filed: Aug. 11, 1995

[86] PCT No.: PCT/CH95/00176

§ 371 Date: Jul. 31, 1998

§ 102(e) Date: Jul. 31, 1998

[87] PCT Pub. No.: WO97/06878

PCT Pub. Date: Feb. 27, 1997

[51] Int. Cl.[7] ............... B01D 35/26; B01D 35/30; B01D 35/153

[52] U.S. Cl. ............ 210/238; 210/767; 210/806; 210/136; 210/416.3; 210/418; 210/419; 210/266; 210/282

[58] Field of Search .............. 210/238, 416.3, 210/136, 241, 266, 418, 282, 419, 420, 423, 424, 767, 806

[56] References Cited

U.S. PATENT DOCUMENTS 5,019,252  5/1991  Kamei .
5,106,500  4/1992  Hembree .
5,569,374  10/1996  Williams .
5,709,794  1/1998  Emmons .

*Primary Examiner*—Thomas M. Lithgow
*Attorney, Agent, or Firm*—Jacox, Meckstroth & Jenkins

[57] ABSTRACT

The small filter comprises a housing (1) and a grip (2). A pump (6, 7, 8) can be operated with the grip. Disposed concentrically around the pump are an activated charcoal filter (3) and a ceramic filter (4). The grip is substantially beaker-shaped with convex front wall (11) and cylindrical lateral walls (14). In its rest position, it enclosed the upper end of the housing, such that the small filter is very compact while the grip still has large gripping or seating surfaces for the fingers and the ball of the thumb.

22 Claims, 2 Drawing Sheets

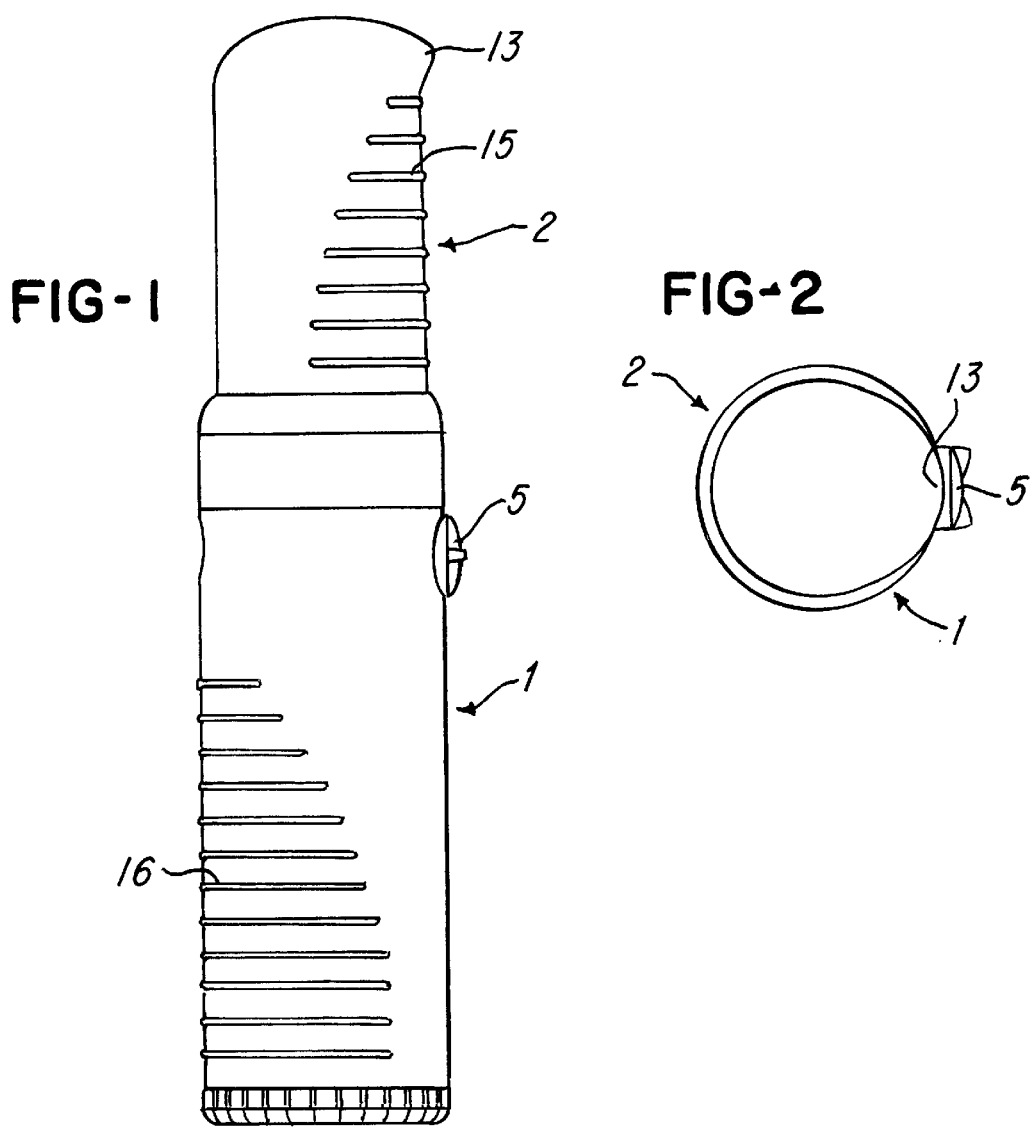
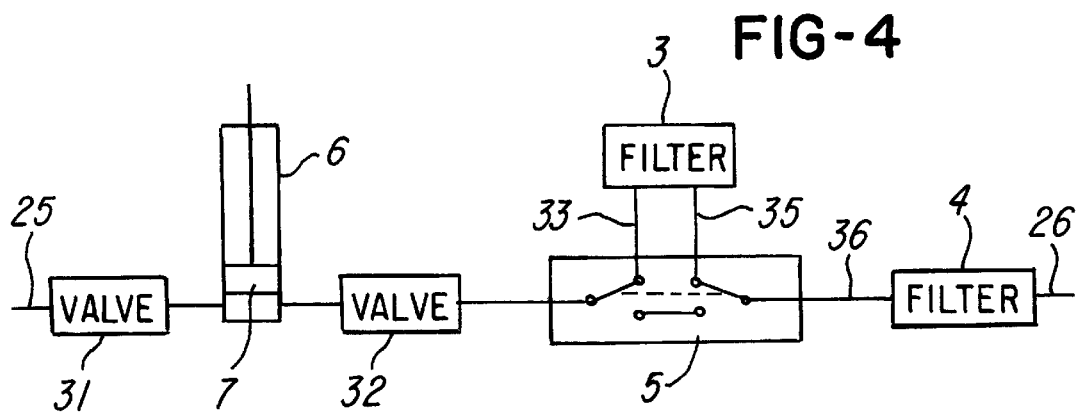

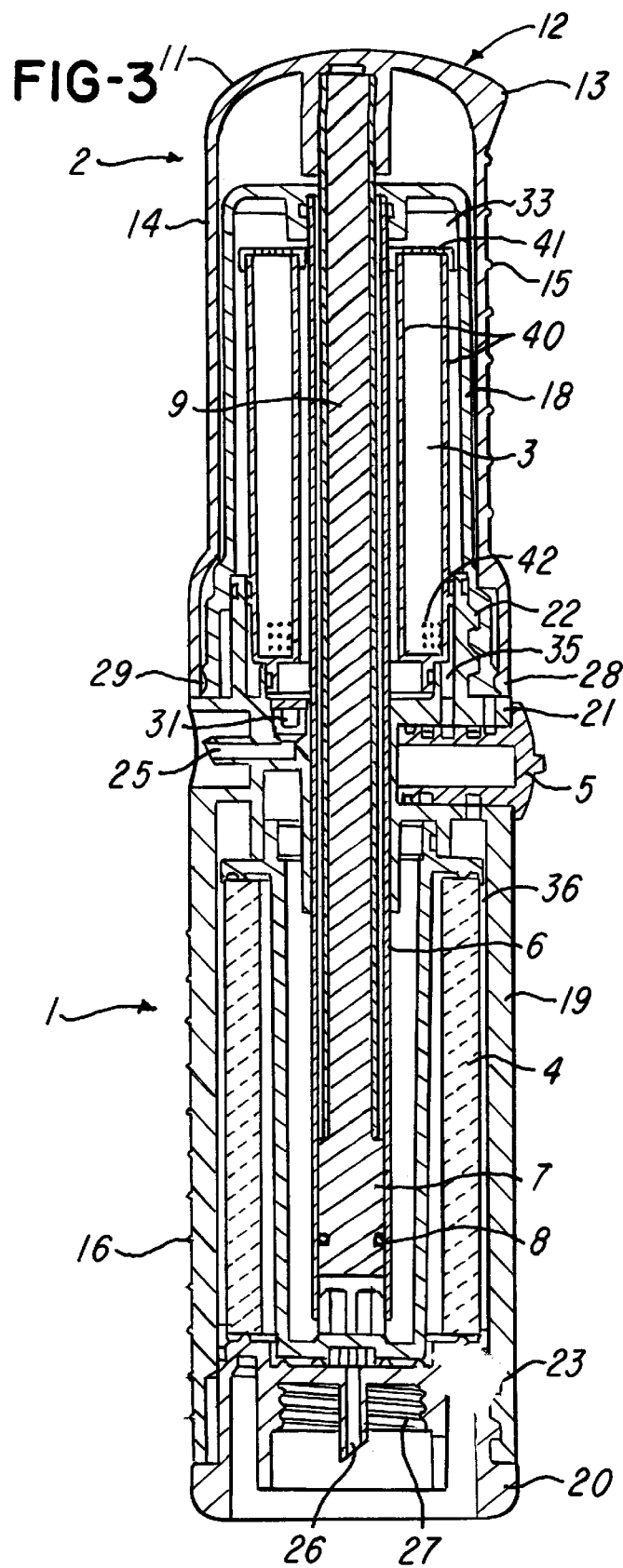

COMPACT PORTABLE HAND-OPERATED FILTER FOR PURIFYING WATER

BACKGROUND OF THE INVENTION

The invention relates to a portable, hand-operated small filter for purifying water.

Portable, hand-operated small filters are devices, which, because of their size and weight, can easily be taken along on journeys, hikes and marches. They usually have a housing volume of about one liter or less and a weight of less than approximately one to two kilogram, such that they can easily be transported far and be operated by a single person.

Known devices of this type comprise a filter with a pore size that is chosen such that physiologically dangerous bacteria are retained.

For operating the pump, a T-shaped grip is usually arranged on known devices, upon operation of which the water to be purified is pressed through the filter.

SUMMARY OF THE INVENTION

It is now an object of the present invention to provide an improved filter, which is as compact and small as possible, such that it can easily be taken along on journeys, marches, etc.

This object is met by the small filter having a grip which encloses at least a front side housing section of the pump.

Because the hand grip is cap-shaped and encloses, in its rest position, a part of the filter housing, a very compact design results. Still, the grip and seating surface, respectively, for the hand are comparatively large, such that the user does not tire during pumping and does not experience unpleasant pressure points.

An especially compact embodiment is achieved when the filter arrangement extends into the section of the housing that is enclosed by the grip, such that the available space is used optimally. A geometry where the filter arrangement surrounds the pump cylinder concentrically has been found to be especially expedient.

The filter arrangement can also comprise two filter stages arranged axially behind each other, wherein one filter stage is arranged in the front side (i.e. grip side) housing section and the second filter stage in the foot side (i.e. lying opposite to the grip) housing section. Depending on application, the water flow can be guided through one or both filter stages.

To simplify handling, grip and housing can be provided with gripping surfaces or grip ribs, respectively, such that the housing can be seized with one hand and the grip with the other.

In an embodiment that is especially convenient to operate, the suction inlet is arranged in a middle section of the housing and the outlet opening at the end of the foot side housing section (i.e. on the side opposite to the grip). In this way, the exit water jet can be controlled securely.

If the grip is provided with a convex front face, a large pressure can be generated during pumping with the ball of the thumb because the force is distributed homogeneously. Preferably, the grip is further provided with a nose extending transversely to the direction of movement and making it easier to pull the grip outwards.

Further applications, advantages and embodiments of the invention are given in the now following description of a preferred embodiment by reference to the figures.

BRIEF DESCRIPTION OF THE DRAWINGS

FIG. 1 is a lateral view of a preferred embodiment of the invention,

FIG. 2 is a view of the device of FIG. 1.

FIG. 3 is a longitudinal sectional view of the device of FIG. 1, and

FIG. 4 a schematic block diagram of the water flow in the device of FIG. 1.

DETAILED DESCRIPTION OF THE PREFERRED EMBODIMENT

The embodiment of the invention shown in FIGS. 1–3 is a compact small filter with a housing 1 and a grip 2. A filter arrangement with a ceramic filter 4 (FIG. 3) and a switch 5 is arranged in the housing 1, the method of operation of which is described below.

The activated charcoal filter 3 and the cylindrical ceramic filter 4 are arranged concentrically, each around a section of a pump cylinder 6, which extends along the longitudinal axis of the housing. A piston 7 runs in the pump cylinder 6 and is sealed against the cylinder wall with a piston ring 8. The piston 7 is connected to the grip 2 by means of a piston rod 9.

The grip 2 has substantially the shape of a beaker. It comprises an end side front wall 11 with convex outer surface 12, which extends into a nose 13 projecting over one side of the grip 2. Further, it comprises a substantially cylindrical lateral wall 14. Grip ribs 15 extending transversely to the longitudinal axis of the device are formed on the outer side of the lateral wall 14.

The housing is divided into a front side housing section 18, a foot-side housing section 19, 20 and an intermediate section 21 lying between them. The front side housing section 18 is beaker shaped, has round cross section and encloses the activated charcoal filter 3. It is attached to the intermediate section 21 by means of a bayonet-type fitting 22 and can be opened for removal of the activated charcoal filter 3. The foot side housing section 19, 20 comprises a cylindrical wall section 19 and a closure lid 20. The closure lid 20 is screwed into the cylindrical wall section 19 by means of a bayonet-type fitting 23 and can be opened for removal of the ceramic filter 4. Horizontal grip ribs 16 extend on the outer surface of the wall section 19.

A suction inlet 25 is arranged laterally on the intermediate section housing section 21. It is used for attaching a tube (not shown) for supplying the water to be purified. The outlet 26 of the purified water is located at the foot end of the pump 1. It is arranged in retracted position in a threading 27, by means of which a standard bottle can be attached to the device.

FIG. 3 shows the grip 2 in its rest position. In this rest position, its lateral wall 14 encloses the front side housing section 18. The inner cross section of the grip 2 substantially corresponds to and complements the shape of the outer cross section of the housing section 18, such that there remains only a small gap between the two parts when the grip is in its rest position. At the lower end of the lateral wall 14 of the grip 2 there is a rib 28, which is snapped into a notch 29 of the housing.

In the following, the function of the device is explained by reference to FIGS. 3 and 4.

During application of the device, the grip is repeatedly moved back and forth along the longitudinal direction of the housing. For this purpose, the user seizes grip 2 with his first hand and housing 1 with his second hand. Preferably, the ball of the thumb of his first hand rests on the convex surface 12 and his fingers reach around the lateral wall 14.

When pulling the grip out, water is pulled into the pump cylinder 6 through suction inlet 25 and through a first check valve 31. When pushing the grip in, the first check valve 31 closes and the water is urged through a second check valve 32 (shown in FIG. 4, but not visible in FIG. 3) to switch 5. The further path of the water depends on the position of switch 5.

If switch 5 is in its first position (shown in FIG. 4), then the water is led through chamber 33, the activated charcoal filter 3, and duct 35 back to switch 5 and from there through duct 36 and ceramic filter 4 to outlet 26. If switch 5 is in its second position, then the water arrives directly at ceramic filter 4 through duct 36 and from there to outlet 26 without passing the activated charcoal filter 3.

Hence, the activated charcoal filter 3 can selectively be switched into the filtering path in front of ceramic filter 4. This has the advantage that the activated charcoal filter is only used when it is really required. This increases the life span of this filter.

The activated charcoal filter 3 primarily serves for improving taste and dechlorinating the water. It preferably consists of an activated charcoal granulate based on coconut shell with a granulation size of e.g. 12–100 USS, preferably 30 to 50 USS, and is enclosed in a container 40. The container 40 comprises input and output openings, in each of which a filter net 41 and 42, respectively, if possible with a mesh size of approximately 10 μm, e.g. 50 μm, is arranged. With this filter net it is prevented that large suspended particles reach the activated charcoal granulate and are caught there. Finer particles are not stopped by the activated charcoal granulate and arrive at the ceramic filter. In this way an unnecessary contamination of the activated charcoal granulate is avoided.

For replacing the filter 3, the activated charcoal granulate in container 40 can be replaced, while container 40 with filter nets 41, 42 can be reused.

The ceramic filter 4 serves, as mentioned, for retaining physiologically noxious bacteria. It consists e.g. on a ceramics based on diatomaceous earth and has a pore size of e.g. 0.2 μm, which is sufficiently small for preventing passage of such bacteria.

Arranging the ceramic filter after the activated charcoal filter has the advantage that possible bacteria from the active charcoal filter are retained.

An undesired pollution of the activated charcoal filter is prevented by the comparatively large granulate size and the mesh filters 41, 42. Very coarse suspended particles are caught by the mesh filters, while finer suspended particles pass the active charcoal granulate unhindered and are caught in the ceramic filter 4.

The design of the grip as shown in FIG. 1 is only one of the possible embodiments of the invention. Thus, the grip can e.g. have an elliptic or rectangular cross section. Nose 13 can also be chosen larger at the expense of compactness or be dispensed with completely. Lateral wall 14 need not be closed, it can also enclose only part of the housing laterally.

Instead of the ceramic filter 4, another filter material for retaining bacteria can be used. Depending on application, the activated charcoal filter 3 can be replaced by another filter type.

While the above description describes a presently preferred embodiment of the invention, it is to be understood that the invention is not be limited thereto and can be carried out in various ways within the scope of the following claims.

What is claimed is:

1. A portable, hand-operated small filter for purifying water comprising a housing having a front section, a filter arrangement located in said housing, a pump, and a grip for operating said pump, wherein said grip is substantially cap-shaped with a front wall forming a seating surface and a lateral wall forming a gripping surface and can be brought into a rest position, where said lateral wall laterally encloses at least partially said front section of said housing.

2. The small filter of claim 1, characterized in that the grip is movable along a longitudinal direction of the housing for operating the pump and that an inner cross section of the second wall corresponds substantially to an outer cross section of the front side housing section.

3. The small filter of claim 2, characterized in that the front side housing section of the housing and the lateral wall are substantially cylindrical.

4. The small filter of claim 1 wherein an outer surface of the front wall is convex.

5. The small filter of claim 1 wherein at least a part of the filter arrangement is arranged in the front side housing section of the housing.

6. The small filter of claim 1 wherein the pump comprises a pump cylinder and a cylinder head movable in the pump cylinder by operation of the hand grip, and that the filter arrangement comprises at least one purification filter arrangement concentrically around the pump cylinder.

7. The small filter of claim 6, characterized in that the housing comprises a foot side housing section opposite the front side housing section, wherein a part of the filter arrangement and of the pump cylinder extend into the foot side housing section.

8. The small filter of claim 7, characterized by a suction inlet arranged between the front side and the foot side housing section.

9. The small filter of claim 7 characterized by an outlet opening arranged at an end of the foot side housing section.

10. A portable, hand operated small filter for purifying water with a filter arrangement in a housing and a pump that can be operated by a grip wherein the grip is substantially cap-shaped with a wall forming a seating surface and a second wall forming a gripping surface and can be brought into a rest position, where the second wall encloses at least partially a front side housing section;

wherein the pump comprises a pump cylinder and a cylinder head movable in the pump cylinder by operation of the hand grip, and that the filter arrangement comprises at least one purification filter arrangement concentrically around the pump cylinder, wherein the housing comprises a foot side housing section opposite the front side housing section, wherein a part of the filter arrangement and of the pump cylinder extend into the foot side housing section; and the filter arrangement comprises two purification filters, wherein a first purification filter is arranged in the front side housing section and a second purification filter is arranged in the foot side housing section.

11. The small filter of claim 10, characterized in that the filter arrangement comprises a switch, by means of which water can selectively be led through both or only one of the purification filters.

12. The small filter of claim 11, characterized in that the switch is arranged between the front side and the foot side housing section.

13. The small filter according to claim 7, characterized in that the front side as well as the foot side housing section can be opened for removal of the purification filters.

14. The small filter according to claim 7, characterized in that a plurality of grip ribs are arranged on the second wall of the grip and on the outer wall of the foot side housing section.

15. The small filter according to claim 1, wherein the grip can be locked to the housing in the rest position.

16. The small filter of claim 15, wherein said filter further comprises means for snapping the grip into the housing.

17. The small filter according to claim 1, wherein the grip comprises at least one nose which extends transversely to a direction of movement of the grip.

18. A portable, hand operated small filter for purifying water with a filter arrangement in a housing and a pump that can be operated by a grip wherein the grip is substantially cap-shaped with a wall forming a seating surface and a second wall forming a gripping surface and can be brought into a rest position, where the second wall encloses at least partially a front side housing section;

wherein said grip comprises a plurality of ribs for facilitating gripping said grip.

19. A method of filtering water using a portable hand-operated filter comprising the steps of providing a filter having a pump housing, a piston situated in a pump cylinder for pumping fluid through the housing, and a grip situated on said piston;

providing the grip such that it at least partially covers a portion of the pump housing when in a closed position;

wherein said grip is substantially cap-shaped with a front wall forming a seating surface and a lateral wall forming a gripping surface and can be brought into a rest position, where said lateral wall laterally encloses at least partially said front section of said housing; and enabling a use to filter water by grasping said grip and manually actuating said piston.

20. The method as recited in claim 19 wherein said method further comprises the step of:

situating at least one filter concentrically about said pump cylinder.

21. A method of filtering water using a portable, hand-operated filter comprising the steps of:

providing a filter having a pump housing, a piston situated in a pump cylinder for pumping fluid through the housing, and a grip situated on said piston;

providing the grip such that it at least partly covers a portion of the pump housing when in a closed position; and enabling a user to filter water by grasping said grip and manually actuating said piston;

wherein said method further comprises the steps of:
providing a plurality of filters in said filter;
providing a switch for selecting use of said plurality of filters.

22. The method as recited in claim 19 wherein said method further comprises the step of:

providing a grip which is at least partially arcuately shaped.

* * * * *